United States Patent
Washizu

(10) Patent No.: US 9,328,184 B2
(45) Date of Patent: *May 3, 2016

(54) BRANCHED CONJUGATED DIENE COPOLYMER, RUBBER COMPOSITION AND PNEUMATIC TIRE

(71) Applicant: SUMITOMO RUBBER INDUSTRIES, LTD., Kobe-shi (JP)

(72) Inventor: Kensuke Washizu, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/368,407

(22) PCT Filed: Jan. 22, 2013

(86) PCT No.: PCT/JP2013/051186
§ 371 (c)(1),
(2) Date: Jun. 24, 2014

(87) PCT Pub. No.: WO2013/115010
PCT Pub. Date: Aug. 8, 2013

(65) Prior Publication Data
US 2014/0357824 A1    Dec. 4, 2014

(30) Foreign Application Priority Data

Feb. 1, 2012   (JP) ................................. 2012-020365
Sep. 28, 2012  (JP) ................................. 2012-217554

(51) Int. Cl.
| | | |
|---|---|---|
| C08F 236/22 | (2006.01) | |
| C08F 236/06 | (2006.01) | |
| C08F 236/10 | (2006.01) | |
| B60C 1/00 | (2006.01) | |
| C08L 9/06 | (2006.01) | |

(52) U.S. Cl.
CPC ............. *C08F 236/06* (2013.01); *B60C 1/0016* (2013.04); *C08F 236/10* (2013.01); *C08F 236/22* (2013.01); *C08L 9/06* (2013.01)

(58) Field of Classification Search
USPC .......................................... 526/336, 337, 340
See application file for complete search history.

(56) References Cited

U.S. PATENT DOCUMENTS

| | | | | |
|---|---|---|---|---|
| 3,018,812 | A * | 1/1962 | Schaffner et al. | 152/209.5 |
| 4,553,578 | A * | 11/1985 | Vitus et al. | 152/209.1 |
| 7,759,444 | B1 | 7/2010 | McPhee | |
| 7,868,114 | B1 * | 1/2011 | McPhee | 526/340.3 |
| 8,912,301 | B2 * | 12/2014 | Washizu | 526/340 |
| 2007/0179260 | A1 | 8/2007 | Hou et al. | |
| 2010/0056714 | A1 | 3/2010 | McPhee | |
| 2010/0056743 | A1 | 3/2010 | McPhee | |
| 2010/0331511 | A1 | 12/2010 | McPhee | |
| 2011/0040058 | A1 * | 2/2011 | McAuliffe et al. | 526/337 |
| 2014/0100316 | A1 | 4/2014 | Washizu | |
| 2014/0200321 | A1 | 7/2014 | Washizu | |
| 2014/0213715 | A1 | 7/2014 | Kuwahara et al. | |
| 2015/0057392 | A1 | 2/2015 | Koda et al. | |

(Continued)

FOREIGN PATENT DOCUMENTS

| | | |
|---|---|---|
| EP | 1 721 914 A1 | 11/2006 |
| JP | 63 179908 | 7/1988 |

(Continued)

OTHER PUBLICATIONS

Newmark (13C-NMR Spectra of cis-Polymyrcene and cis-Polyfarnesene. Journal of Polymer Science: Part A: Polymer Chemistry, 1988, 26, 71-77).*

(Continued)

*Primary Examiner* — Brieann R Fink
(74) *Attorney, Agent, or Firm* — Oblon, McClelland, Maier & Neustadt, L.L.P.

(57) ABSTRACT

There is provided a branched conjugated diene copolymer prepared by copolymerizing 1 to 99% by weight of a branched conjugated diene compound (1):

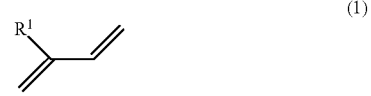

(1)

wherein $R^1$ is an aliphatic hydrocarbon having 6 to 11 carbon atoms,
less than 99% by weight of a conjugated diene compound (2):

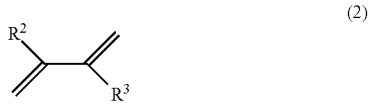

(2)

wherein $R^2$ and $R^3$ are the same or different and each is a hydrogen atom, or the like, and
less than 99% by weight of a vinyl compound (3):

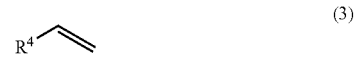

(3)

wherein $R^4$ is an aromatic hydrocarbon group having 6 to 10 carbon atoms, or the like. The branched conjugated diene copolymer is useful as a rubber component of a rubber composition for a tire enhancing both of abrasion resistance and grip performance to a high level and exhibiting excellent processability.

20 Claims, No Drawings

(56) References Cited

U.S. PATENT DOCUMENTS

2015/0057403 A1 2/2015 Koda et al.
2015/0087763 A1 3/2015 Koda et al.

FOREIGN PATENT DOCUMENTS

| JP | 5 125108 | 5/1993 |
| JP | 5 125225 | 5/1993 |
| JP | 2008 156516 | 7/2008 |
| WO | 2005 085306 | 9/2005 |
| WO | 2010 027463 | 3/2010 |
| WO | 2010 027464 | 3/2010 |
| WO | WO 2013/047347 A1 | 4/2013 |
| WO | WO 2013/151067 A1 | 10/2013 |
| WO | WO 2013/151068 A1 | 10/2013 |
| WO | WO 2013/151069 A1 | 10/2013 |

OTHER PUBLICATIONS

Johanson (Emulsion Polymerization of Myrecene. Industrial and Engineering Chemistry. Mar. 1948. pp. 500-502).*
Code of Federal Regulations (The National Archives of the United States, 1949 Edition, 8 pages).*
International Search Report Issued Mar. 19, 2013 in PCT/JP13/051186 Filed Jan. 22, 2013.
Extended European Search Report issued Nov. 14, 2014 in Patent Application No. 13743537.6.
U.S. Appl. No. 14/368,407, filed Jun. 24, 2014, Washizu.
U.S. Appl. No. 14/370,323, filed Jul. 2, 2014, Washizu.
U.S. Appl. No. 14/378,193, filed Aug. 12, 2014, Washizu.
U.S. Appl. No. 14/378,186, filed Aug. 12, 2014, Washizu.
Office Action issued Nov. 9, 2015 in European Patent Application No. 13 743 537.6.

* cited by examiner

BRANCHED CONJUGATED DIENE COPOLYMER, RUBBER COMPOSITION AND PNEUMATIC TIRE

TECHNICAL FIELD

The present invention relates to a branched conjugated diene copolymer, a rubber composition comprising the copolymer, and a pneumatic tire produced using the rubber composition.

BACKGROUND ART

For high performance tires such as tires used for racing, especially a high level abrasion resistance and grip performance are demanded.

As a method for improving abrasion resistance of tires, a method of blending, to a rubber composition for a tire, a high molecular weight polymer (for example, one having a molecular weight of 250,000 or more, 500,000 or more, or 1,000,000 or more) and a carbon black as a filler is known. Also, it is generally known as a method for improving grip performance to blend, to a rubber composition for a tire, a rubber having a high glass transition temperature (Tg) (for example, one having Tg of −20° C. or more), a carbon black having a large surface area (for example, one having a nitrogen absorption specific surface area of 110 m$^2$/g or more), and the like.

However, in the case of using a high molecular weight polymer having a molecular weight of 250,000 or more for a rubber composition for a tire, there is a problem that a hardness of the rubber composition increases as a molecular weight increases, thereby deteriorating processability. Also, as a method of increasing a glass transition point of a rubber composition for a tire, there is a method of increasing a styrene content in a polymer. However, if a styrene content increases, for example, to 25% or more, a hardness of a rubber increases, which leads to deterioration of processability. Further, in the case of using a carbon black, if a carbon black having a large surface area is used, there are demerits such as lowering of its dispersion, and increase in a hardness of a rubber composition resulting in deterioration of processability.

On the other hand, it is known that for improving processability, a process oil, a sticky resin, a liquid styrene-butadiene rubber or the like is added to a rubber composition. However, addition of them leads to decrease in strength of a rubber composition, and therefore, there is a limit in their amount to be used.

The present situation is such that so far there has not been obtained a rubber composition for a tire tread rubber enhancing both of abrasion resistance and grip performance to a high level and exhibiting excellent processability.

Myrcene is a natural organic compound and is a kind of olefin belonging to monoterpene. There are two kinds of isomers as myrcene such as α-myrcene (2-methyl-6-methyleneocta-1,7-diene) and β-myrcene (7-methyl-3-methylenocta-1,6-diene). In Patent Document 1, a polymer of myrcene is disclosed.

Farnesene is a kind of isoprenoid compound synthesized chemically by oligomerization of isoprene or dehydration reaction of nerolidol, and is used mainly as a perfume or its starting material (Patent Document 2).

PRIOR ART DOCUMENTS

Patent Documents

Patent Document 1: JP 63-179908 A
Patent Document 2: JP 2008-156516 A

SUMMARY OF THE INVENTION

Problem to be Solved by the Invention

An object of the present invention is to provide a novel branched conjugated diene copolymer as a rubber component for a rubber composition for a tire being useful for improvement of processability, a rubber composition for a tire comprising the branched conjugated diene copolymer, particularly a rubber composition for a tire enhancing both of abrasion resistance and grip performance to a high level and exhibiting excellent processability, and a pneumatic tire produced using the rubber composition for a tire.

Means to Solve the Problem

The present invention relates to a branched conjugated diene copolymer prepared by copolymerizing a branched conjugated diene compound (1) represented by the general formula (1):

wherein R$^1$ is an aliphatic hydrocarbon having 6 to 11 carbon atoms, a conjugated diene compound represented by the general formula (2):

wherein R$^2$ and R$^3$ are the same or different and each is a hydrogen atom, an aliphatic hydrocarbon group having 1 to 3 carbon atoms or a halogen atom, and
a vinyl compound represented by the general formula (3):

wherein R$^4$ is a hydrogen atom, an aliphatic hydrocarbon group having 1 to 3 carbon atoms, an alicyclic hydrocarbon group having 3 to 8 carbon atoms, or an aromatic hydrocarbon group having 6 to 10 carbon atoms,
wherein a copolymerization ratio (l) of the branched conjugated diene compound (1) is 1 to 99% by weight, a copolymerization ratio (m) of the conjugated diene compound (2) is less than 99% by weight, and a copolymerization ratio (n) of the vinyl compound (3) is less than 99% by weight.

It is preferable that the copolymerization ratio (l) of the branched conjugated diene compound (1) is not less than 2.5 and less than 75% by weight, the copolymerization ratio (m) of the conjugated diene compound (2) is 72.5% by weight or less, and the copolymerization ratio (n) of the vinyl compound (3) is not less than 25 and less than 97.5% by weight.

Further, the present invention relates to the above-mentioned branched conjugated diene copolymer intended for improvement of processability and being lower in a Mooney viscosity $ML_{1+4}$ (130° C.) compared with a copolymer which has the same weight-average molecular weight and in which the branched conjugated diene compound (1) is replaced by the conjugated diene compound (2).

It is preferable that the branched conjugated diene compound (1) is myrcene and/or farnesene.

It is preferable that the conjugated diene compound (2) is 1,3-butadiene and/or isoprene.

It is preferable that the vinyl compound (3) is one or more selected from the group consisting of styrene, α-methylstyrene, α-vinylnaphthalene and β-vinylnaphthalene.

Further, the present invention relates to a rubber composition comprising the above-mentioned branched conjugated diene copolymer.

Furthermore, the present invention relates to a pneumatic tire produced using the above-mentioned rubber composition.

Effects of the Invention

According to the present invention, a novel branched conjugated diene copolymer as a rubber component for a tire being useful for improvement of processability can be provided, and by using the novel branched conjugated diene copolymer, a rubber composition for a tire enhancing both of abrasion resistance and grip performance to a high level and exhibiting excellent processability can be provided.

The rubber composition for a tire of the present invention is useful particularly as a rubber composition for a tire tread, and as a rubber composition for a tire used for racing.

Further, according to the present invention, a pneumatic tire produced using the rubber composition for a tire can be provided.

Namely, in the present invention, even in the case of using, as rubber components, a polymer having a large weight-average molecular weight (Mw) (for example, 250,000 or more, 500,000 or more, or 1,000,000 or more) or a polymer having a large content of the vinyl compound (3) (for example, 25% by weight or more, or 40% by weight or more) in order to improve abrasion resistance and grip performance of a tire, it is possible to provide a rubber composition for a tire tread having decreased Mooney viscosity and being excellent in processability by blending the branched conjugated diene compound (1) as a component for the polymer. Further, the blending of the branched conjugated diene compound (1) can also provide the feature of giving only a little effect on the glass transition temperature (Tg) of the polymer.

Embodiment for Carrying Out the Invention

<Branched Conjugated Diene Copolymer>

The branched conjugated diene copolymer of the present invention means a copolymer obtained by copolymerizing the branched conjugated diene compound (1), the conjugated diene compound (2), and the vinyl compound (3).

The weight-average molecular weight (Mw) of the branched conjugated diene copolymer of the present invention is not limited particularly as long as it is 3,000 or more, and is preferably 250,000 or more, more preferably 500,000 or more, further preferably 1,000,000 or more. This is because when Mw is less than 3,000, there is a tendency that the copolymer becomes a liquid polymer having high flowability, and when Mw is less than 250,000, there is a tendency that it does not cause any problem of decrease in hardness of the rubber composition and deterioration of processability. On the other hand, Mw is not limited as long as it is 3,000,000 or less, and is preferably 2,000,000 or less. When Mw is more than 3,000,000, there is a tendency that the copolymer is in a solid form having no rubber elasticity.

The number-average molecular weight (Mn) of the branched conjugated diene copolymer is preferably 3,000 or more, more preferably 250,000 or more. This is because when Mn is less than 3,000, there is a tendency that it does not cause any problem of decrease in hardness of the rubber composition and deterioration of processability. On the other hand, Mn is preferably 3,000,000 or less, more preferably 2,000,000 or less. When Mn is more than 3,000,000, there is a tendency that the copolymer is in a solid form having no rubber elasticity.

In the branched conjugated diene copolymer, a preferable range of a ratio of Mw to the number-average molecular weight (Mn), namely, Mw/Mn is 20.0 or less, more preferably 10.0 or less. When Mw/Mn is more than 20.0, there is a tendency that it does not cause any problem of decrease in hardness of the rubber composition and deterioration of processability. On the other hand, a lower limit of the Mw/Mn is not limited particularly, and even when it is 1.0 or more, no problem arises.

The glass transition temperature (Tg) of the branched conjugated diene copolymer is usually within a range of –110° C. to 110° C. For example, Tg of the branched conjugated diene copolymer containing a relatively large amount of high-cis butadiene and prepared using a transition-metal catalyst tends to become lower as the amount of the high-cis butadiene is increased, and Tg of the branched conjugated diene copolymer containing a relatively large amount of styrene and prepared using an anionic polymerization catalyst tends to become higher as the amount of the contained styrene is increased. In the branched conjugated diene copolymer, the branched conjugated diene copolymer containing high-cis butadiene in a large amount and the branched conjugated diene copolymer containing styrene in a large amount exhibit improvement of processability only by blending and copolymerizing a small amount of the branched conjugated diene compound (1). However, in most cases, Tg hardly varies by blending of the branched conjugated diene compound (1).

A Mooney viscosity $ML_{1+4}$ (130° C.) of the branched conjugated diene copolymer is not limited particularly as long as it is lower compared with a copolymer which has the same molecular weight and in which the branched conjugated diene compound (1) constituting the copolymer is replaced by the conjugated diene compound (2) since an effect of improving processability in the present invention can be exhibited. Generally the Mooney viscosity is preferably 25 or more, more preferably 30 or more. When the Mooney viscosity is less than 25, the copolymer tends to have fluidity. On the other hand, the Mooney viscosity is preferably 160 or less, more preferably 150 or less, further preferably 100 or less, further preferably 60 or less. If the Mooney viscosity exceeds 160, there is a tendency that a large amount of a softening agent or processing aid is necessary at the time of processing.

In the branched conjugated diene copolymer, copolymerization ratios of the branched conjugated diene compound (1), the conjugated diene compound (2), and the vinyl compound (3) which are monomers are explained.

The copolymerization ratio (l) of the branched conjugated diene compound (1) is not limited particularly as long as it is 1 to 99% by weight. The copolymerization ratio is preferably 2.5% by weight or more, further preferably 5% by weight or more. If the copolymerization ratio is less than 1% by weight, there is a tendency that a sufficient effect of improving processability by blending the branched conjugated diene compound (1) cannot be obtained. On the other hand, the copolymerization ratio is preferably less than 75% by weight, more preferably less than 60% by weight, further preferably less than 50% by weight, further preferably less than 15% by weight. This is because when the compound is blended in a copolymerization ratio of more than 99% by weight, the copolymer tends to be a polymer having fluidity, and when the compound is blended in a copolymerization ratio of as much as 15%, by weight, there is a tendency that a sufficient effect resulting from the blending of the branched conjugated diene compound (1) for improvement of processability can be exhibited.

The branched conjugated diene copolymer of the present invention includes both of the conjugated diene compound (2), and the vinyl compound (3).

In the branched conjugated diene copolymer, the preferable range of the copolymerization ratio (m) of the conjugated diene compound (2) is 1% by weight or more, more preferably 50% by weight or more. If "m" is less than 1% by weight, the copolymer tends to be a polymer having fluidity. On the other hand, the copolymerization ratio is less than 99% by weight, more preferably less than 80% by weight, further preferably less than 72.5% by weight, further preferably less than 55% by weight. If "m" is 99% by weight or more, there is a tendency that an effect of blending the branched conjugated diene compound (1) for improving processability is decreased.

The preferable range of the copolymerization ratio (n) of the vinyl compound (3) is 10% by weight or more, more preferably 25% by weight or more, further preferably 40% by weight or more. If "n" is less than 10% by weight, there is a tendency that a hardness of the rubber is not so high as to raise a concern on processability and an effect of copolymerizing the branched conjugated diene compound (1) for improving processability is decreased. If "n" is 25% by weight or more, it is preferable because there is a tendency that the ratio contributes to improving grip performance of the rubber and, in addition, an effect of improving processability by blending the branched conjugated diene compound (1) is exhibited significantly since there arises a problem that processability of the copolymer is deteriorated. Such a tendency is seen further significantly in the case of "n" being 40% by weight or more. The copolymerization ratio is less than 99% by weight, preferably less than 97.5% by weight, more preferably less than 95% by weight, further preferably less than 80% by weight, more preferably less than 60% by weight. If "n" is 99% by weight or more, there is a tendency that the copolymer becomes not in the form of rubber but in the form of resin and an effect resulting from blending the branched conjugated diene compound (1) is decreased.

In the branched conjugated diene copolymer, since the total of the copolymerization ratios "l", "m" and "n" of the branched conjugated diene compound (1), the conjugated diene compound (2), and the vinyl compound (3) is 100% by weight, when the lower limit of any one of them is selected from the above-mentioned preferable range, allowable ranges of the upper limits of the other two are determined accordingly. Also, when the lower limits of any two of them are selected from the above-mentioned preferable ranges, the upper limit of the other one is determined accordingly. Similarly, with respect to the copolymerization ratios "l", "m" and "n", when the upper limit of any one of them is selected from the above-mentioned preferable range, allowable ranges of the lower limits of the other two are determined accordingly. Also, when the upper limits of any two of them are selected from the above-mentioned preferable ranges, the lower limit of the other one is determined accordingly.

<Branched Conjugated Diene Compound (1)>

In the branched conjugated diene compound (1), examples of the aliphatic hydrocarbon group having 6 to 11 carbon atoms are those having a normal structure such as hexyl, heptyl, octyl, nonyl, decyl and undecyl, isomers and/or unsaturated forms thereof, and derivatives thereof (for example, halides, hydroxides, and the like). Among these, 4-methyl-3-pentenyl group, 4,8-dimethyl-nona-3,7-dienyl group, and the like, and derivatives thereof are preferred particularly.

Examples of the branched conjugated diene compound (1) are myrcene, farnesene, and the like.

In the present invention, "myrcene" includes α-myrcene (2-methyl-6-methylenocta-1,7-diene) and β-myrcene, and among these, β-myrcene (7-methyl-3-methyleneocta-1,6-diene) having the following structure is preferred.

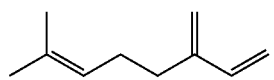

(4)

On the other hand, "farnesene" includes any isomers such as α-farnesene ((3E,7E)-3,7,11-trimethyl-1,3,6,10-dodecatetraene) and β-farnesene, and among these, (E)-β-farnesene (7,11-dimethyl-3-methylene-1,6,10-dodecatriene) having the following structure is preferred.

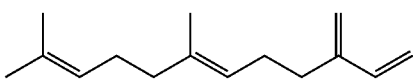

(5)

The branched conjugated diene compounds (1) can be used alone or can be used in combination of two or more thereof.

<Conjugated Diene Compound (2)>

In the conjugated diene compound (2), examples of the aliphatic hydrocarbon group having 1 to 3 carbon atoms are methyl, ethyl, n-propyl, isopropyl, and the like, and among these, methyl is preferred. Examples of the halogen atom are fluorine, chlorine, bromine and iodine, and among these, chlorine is preferred.

Each of $R^2$ or $R^3$ of the conjugated diene compound (2) is independently preferably a hydrogen atom, methyl, ethyl, n-propyl or isopropyl, and a hydrogen atom or methyl is more preferred. Examples of the conjugated diene compound (2) are 1,3-butadiene, isoprene, 2,3-dimethyl-1,3-butadiene, and the like, and among these, 1,3-butadiene and isoprene are preferred.

The conjugated diene compounds (2) can be used alone or can be used in combination of two or more thereof.

<Vinyl Compound (3)>

In the vinyl compound (3), examples of the aliphatic hydrocarbon group having 1 to 3 carbon atoms are methyl, ethyl, n-propyl, isopropyl, and the like, and among these, methyl is preferred. Examples of the alicyclic hydrocarbon group having 3 to 8 carbon atoms are cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, cyclooctenyl, and the like, and among these, cyclopropyl and cyclobutyl are preferred. Examples of the aromatic hydrocarbon group having 6 to 10 carbon atoms are phenyl, benzyl, phenethyl, tolyl, xylyl, naphthyl, and the like. The substitution position of methyl on the benzene ring of tolyl includes any of ortho, meta and para positions, and the substitution positions of methyl in xylyl also include any of optional substitution positions. Among these groups, preferred are phenyl, tolyl and naphthyl. Examples of the preferred vinyl compound (3) are styrene, α-methylstyrene, α-vinylnaphthalene and β-vinylnaphthalene.

The vinyl compounds (3) can be used alone or can be used in combination of two or more thereof.

<Preparation Method>

The branched conjugated diene copolymer of the present invention can be obtained by copolymerizing the branched conjugated diene compound (1), the conjugated diene compound (2), and the vinyl compound (3).

In such a copolymerization process, an order of copolymerization of monomers is not limited particularly. For example, all the monomers may be subjected to random copolymerization simultaneously, or after previously copolymerizing specific monomer or monomers (for example, only the branched conjugated diene compound (1) monomer, only the conjugated diene compound (2) monomer, only the vinyl compound (3) monomer, or two kinds of monomers arbitrarily selected from these), the remaining monomers or monomer may be added and copolymerized, or each monomer may be previously copolymerized respectively, and then subjected to block copolymerization.

Such copolymerization can be carried out by a usual method, for example, by anionic polymerization reaction, coordination polymerization reaction, or the like.

A polymerization method is not limited particularly, and any of a solution polymerization method, an emulsion polymerization method, a gas phase polymerization method and a bulk polymerization method can be used. Among these, a solution polymerization method is preferred. The polymerization may be carried out batchwise or continuously.

<Anionic Polymerization>

Anionic polymerization can be carried out in a proper solvent in the presence of an anionic initiator. As an anionic initiator, any of usual ones can be used suitably, and examples of such an anionic initiator are organolithium compounds having a general formula RLix (R is an aliphatic, aromatic or alicyclic group having one or more carbon atoms, x is an integer of 1 to 20). Examples of proper organolithium compounds are methyllithium, ethyllithium, n-butyllithium, sec-butyllithium, tert-butyllithium, phenyllithium and naphthyllithium. Preferred organolithium compounds are n-butyllithium, and sec-butyllithium. Anionic initiators can be used alone or can be used in a mixture of two or more thereof. An amount of a polymerization initiator for anionic polymerization is not limited particularly, and it is preferable to use, for example, in an amount of preferably from about 0.05 mmol to 35 mmol, more preferably from about 0.05 mmol to 0.2 mmol per 100 g of all the monomers to be subjected to polymerization. If the amount of the polymerization initiator is less than 0.05 mmol, there is a tendency that the copolymer becomes not in the form of rubber but in the form of resin, and if time amount of the polymerization initiator is more than 35 mmol, there is a tendency that the copolymer is soft and an effect produced by copolymerizing the branched conjugated diene compound (1) for processability is decreased.

As a solvent to be used for the anionic polymerization, any of solvents can be used suitably as long as they neither inactivate the anionic initiator nor stop the polymerization reaction, and any of polar solvents and nonpolar solvents can be used. Examples of polar solvents are ether solvents such as tetrahydrofuran, and examples of nonpolar solvents are chain hydrocarbons such as hexane, heptane, octane and pentane, cyclic hydrocarbons such as cyclohexane, aromatic hydrocarbons such as benzene, toluene and xylene, and the like. These solvents can be used alone or can be used in a mixture of two or more thereof.

It is further preferable to carry out the anionic polymerization in the presence of a polar compound. Examples of polar compounds are dimethyl ether, diethyl ether, ethyl methyl ether, ethyl propyl ether, tetrahydrofuran, dioxane, diphenyl ether, tripropylamine, tributylamine, trimethylamine, triethylamine, N,N,N',N'-tetramethylethylenediamine (TMEDA), and the like. Polar compounds can be used alone or can be used in a mixture of two or more thereof. The polar compound affects controlling the micro structure of butadiene portion and is useful for reducing the content of 1,2-structure. The amount of polar compound varies depending on kind thereof and the polymerization conditions, and a molar ratio thereof to the anionic initiator (polar compound/anionic initiator) is preferably 0.1 or more. When the molar ratio of the polar compound to the anionic initiator (polar compound/anionic initiator) is less than 0.1, there is a tendency that an effect of using the polar compound for controlling the micro structure is not sufficient.

The reaction temperature of the anionic polymerization is not limited particularly as long as the reaction advances properly, and usually is preferably from −10° C. to 100° C., more preferably from 25° C. to 70° C. In addition, the reaction time varies depending on charging amounts, reaction temperature and other conditions, and usually, for example, about 3 hours is sufficient.

The above-mentioned anionic polymerization can be terminated by adding a reaction inhibitor to be usually used in this field. Examples of the reaction inhibitor are polar solvents having an active proton such as alcohols, for example, methanol, ethanol and isopropanol or acetic acid, a mixture thereof, or a mixture of the polar solvents with nonpolar solvents such as hexane and cyclohexane. A sufficient amount of reaction inhibitor is usually an equimolar amount or two-fold molar amount to the anionic initiator.

After the polymerization reaction, the branched conjugated diene copolymer can be separated from the polymerization solution easily by removing the solvent by a usual method or by pouring the polymerization solution in an alcohol of an amount equal to or more than the amount of polymerization solution and precipitating the branched conjugated diene copolymer.

<Coordination Polymerization>

The coordination polymerization can be carried out using a coordination polymerization initiator instead of the anionic initiator in the anionic polymerization. Any of usual coordination polymerization initiators can be suitably used, and examples thereof are catalysts that are transition metal-containing compounds such as lanthanoid compounds, titanium compounds, cobalt compounds and nickel compounds. In addition, if desired, an aluminum compound or a boron compound can be used as a co-catalyst.

The lanthanoid compound is not limited particularly as long as it contains any of elements (lanthanoids) of atomic numbers 57 to 71, and among these lanthanoids, neodymium is preferred particularly. Examples of the lanthanoid compounds are carboxylates, β-diketone complexes, alkoxides, phosphates, phosphites, halides and the like of these elements. Among these, from the viewpoint of easy handling, carboxylates, alkoxides, and β-diketone complexes are preferred. Examples of the titanium compounds are titanium-containing compounds having one of a cyclopentadienyl group, an indenyl group, a substituted cyclopentadienyl group or a substituted indenyl group and also having 3 substituents selected from a halogen, an alkoxysilyl group and an alkyl group, and preferred are compounds having one alkoxysilyl group from the viewpoint of catalytic activity. Examples of the cobalt compounds are halides, carboxylates, β-diketone complexes, organic base complexes, organic phosphine complexes, and the like of cobalt. Examples of the nickel compounds are halides, carboxylates, β-diketone complexes, organic base complexes, and the like of nickel. Catalysts to be used as a coordination polymerization initiator can be used alone or can be used in combination of two or more thereof. An amount of a catalyst to be used as a polymerization initiator for the coordination polymerization is not limited particularly, and for example, a preferred amount thereof is the same as the amount of the catalyst for the anionic polymerization.

Examples of the aluminum compounds to be used as a co-catalyst are organic aluminoxanes, halogenated organoaluminum compounds, organoaluminum compounds, hydrogenated organoaluminum compounds, and the like. Examples of the organic aluminoxanes are alkyl aluminoxanes (such as methyl aluminoxane, ethyl aluminoxane, propyl aluminoxane, butyl aluminoxane, isobutyl aluminoxane, octyl aluminoxane, and hexyl aluminoxane); examples of the halogenated organoaluminum compounds are halogenated alkyl aluminum compounds (such as dimethyl aluminum chloride, diethyl aluminum chloride, methyl aluminum dichloride, and ethyl aluminum dichloride); examples of the organoaluminum compounds are alkyl aluminum compounds (such as trimethylaluminum, triethylaluminum, triisopropylaluminum, and triisobutylaluminum); and examples of the hydrogenated organoaluminum compounds are hydrogenated alkyl aluminum compounds (such as diethylaluminum hydride, and diisobutylaluminum hydride). Examples of the boron compounds are compounds having anion species such as tetraphenylborate, tetrakis(pentafluorophenyl)borate, and (3,5-bistrifluoromethylphenyl)borate. These co-catalysts can also be used alone or can be used in combination of two or more thereof.

In the coordination polymerization, the solvents and the polar compounds explained in the anionic polymerization can be used similarly. In addition, the reaction time and the reaction temperature are the same as those explained in the anionic polymerization. Termination of the polymerization reaction and separation of the branched conjugated diene copolymer can also be carried out in the same manner as in the anionic polymerization.

The weight-average molecular weight (Mw) of the branched conjugated diene copolymer can be controlled by a usual method, for example, by adjusting the amounts of branched conjugated diene compound (1) and other monomers to be charged at the polymerization. For example, by increasing the ratio of all the monomers to the anionic polymerization catalyst, Mw can be increased, and by decreasing the ratio, Mw can be decreased. The same is applied also for the number-average molecular weight (Mn) of the branched conjugated diene copolymer.

Tg of the branched conjugated diene copolymer can be controlled by a usual method, for example, by adjusting the amounts of conjugated diene compound (2) and vinyl compound (3) to be charged at the polymerization. For example, by increasing the copolymerization ratio of vinyl compound (3), Tg can be made high, and on the contrary, by decreasing the copolymerization ratio of vinyl compound (3), Tg can be made low.

The Mooney viscosity of the branched conjugated diene copolymer can be controlled by a usual method, for example, by adjusting the amount of branched conjugated diene compound (1) monomer to be charged at the polymerization. For example, by decreasing the amount of branched conjugated diene compound (1) monomer, the Mooney viscosity is increased, and on the contrary, by increasing the amount of branched conjugated diene compound (1) monomer, the Mooney viscosity is decreased.

By blending other components which are usually used in the field of rubber industry with the thus obtained branched conjugated diene copolymer of the present invention, a rubber composition for a tire can be prepared.

Examples of the components to be blended in the rubber composition of the present invention are rubber components other than the branched conjugated diene copolymer, a filler, a silane coupling agent, and the like.

In the rubber composition for a tire of the present invention, the amount of the branched conjugated diene copolymer in the rubber components is about 3% by weight or more, preferably 5% by weight or more, more preferably 10% by weight or more, further preferably 30% by weight or more. When the amount of the branched conjugated diene copolymer is less than 3% by weight, there is a tendency that the effect of blending it for processability is decreased. On the other hand, an upper limit of the amount of the branched conjugated dine copolymer is not limited particularly, and may be 100% by weight.

In the present invention, examples of the rubber components to be used together with the branched conjugated diene copolymer are diene rubbers such as a natural rubber (NR), an isoprene rubber (IR), a butadiene rubber (BR), a styrene-butadiene rubber (SBR), a styrene-isoprene rubber (SIR), a styrene-isoprene-butadiene rubber (SIBR), an ethylene propylene diene rubber (EPDM), a chloroprene rubber (CR), an acrylonitrile-butadiene rubber (NBR), a butyl rubber (IIR), and the like. These diene rubbers may be used alone or may be used in combination of two or more thereof. Among these, it is preferable to use NR, BR, or SBR for the reason that a well-balanced grip performance and abrasion resistance can be obtained in combination use with the branched conjugated diene copolymer, and it is more preferable to use NR. NR is not limited particularly, and those commonly used for production of tires can be used. Examples thereof are SIR20, RSS#3, TSR20, and the like.

Examples of the filler are carbon black, silica, and the like which are commonly used in this field.

Carbon blacks which are used generally in production of tires can be used, and examples thereof are SAF, ISAF, HAF, FF, FEF, GPF, and the like. These carbon blacks can be used alone or can be used in combination of two or more thereof. The nitrogen adsorption specific surface area ($N_2SA$) of carbon black is not less than about 80 $m^2/g$, preferably not less than about 110 $m^2/g$. When $N_2SA$ is less than 80 $m^2/g$, both of grip performance and abrasion resistance tend to be lowered. When $N_2SA$ is less than 110 $m^2/g$, an effect of using the branched conjugated diene copolymer for improving processability tends to be decreased. $N_2SA$ of carbon black is not more than about 270 $m^2/g$, preferably not more than about 260 $m^2/g$. When $N_2SA$ of carbon black is more than 270 $m^2/g$, dispersibility of carbon black tends to be decreased.

A blending amount of carbon black is about 1 part by weight or more, preferably about 3 parts by weight or more based on 100 parts by weight of the rubber components.

When the blending amount of carbon black is less than 1 part by weight, abrasion resistance tends to be lowered. The blending amount of carbon black is not more than about 200 parts by weight, more preferably not more than 150 parts by weight. When the blending amount of carbon black exceeds 200 parts by weight, processability tends to be lowered.

As silica, for example, silica (anhydrous silica) prepared by a dry method and silica (hydrous silica) prepared by a wet method are exemplified. Among these, silica prepared by a wet method is preferred for the reason that there are many surface silanol groups and many reaction points with a silane coupling agent. $N_2SA$ of silica is not less than about 50 $m^2/g$, preferably not less than about 80 $m^2/g$. When $N_2SA$ is less than 50 $m^2/g$, there is a tendency that a reinforcing effect is small and abrasion resistance is decreased. $N_2SA$ of silica is not more than about 300 $m^2/g$, preferably not more than about 250 $m^2/g$. When $N_2SA$ is more than 300 $m^2/g$, there is a tendency that dispersibility of silica is decreased and processability is lowered.

A blending amount of silica is about 1 part by weight or more, preferably about 10 parts by weight or more based on 100 parts by weight of the rubber components. When the blending amount of silica is less than 1 part by weight, there is a tendency that abrasion resistance is not sufficient. The blending amount of silica is about 150 parts by weight or less, more preferably 100 parts by weight or less. When the blending amount of carbon black exceeds 150 parts by weight, there is a tendency that dispersibility of silica is decreased and processability is lowered.

It is preferable that the rubber composition comprises a silane coupling agent. As the silane coupling agent, a silane coupling agent which has been well-known can be used. Examples thereof are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane, and the like. These silane coupling agents can be used alone, or can be used in combination of two or more thereof. From the viewpoint of good processability, it is preferable that among these, bis(3-triethoxysilylpropyl)tetrasulfide of bis(3-triethoxysilylpropyl)disulfide is contained in the rubber composition.

When the silane coupling agent is contained, the blending amount thereof is preferably 1 part by weight or more, more preferably 2 parts by weight or more based on 100 parts by weight of silica. When the amount of silane coupling agent is less than 1 part by weight, there is a tendency that a sufficient improving effect of dispersibility cannot be obtained. The amount of silane coupling agent is preferably 20 parts by weight or less, more preferably 15 parts by weight or less. When the amount of silane coupling agent exceeds 20 parts by weight, there is a tendency that a sufficient coupling effect cannot be obtained and a reinforcing property is decreased.

In addition to the above-mentioned components, compounding agents which have been used in the field of rubber industry, for example, other reinforcing filler, an antioxidant, an oil, a wax, a vulcanizing agent such as sulfur, a vulcanization accelerator, a vulcanization aid, and the like can be properly blended to the rubber composition of the present invention.

The thus obtained rubber composition of the present invention can be used as various parts for tires, and can be suitably used especially for a tire tread, in particular, for a tire tread for a high performance tire such as a racing tire since abrasion resistance and grip performance can be improved to a high level.

The rubber composition of the present invention can be used for production of tires and can be formed into tires by a usual method. Namely, a mixture obtained by optionally blending the above-mentioned components according to necessity is subjected to kneading, extrusion processing to a shape of each part of a tire at an unvulcanized stage, and molding on a tire molding machine by a usual method, thus forming an unvulcanized tire. A tire can be obtained by heating and compressing this unvulcanized tire in a vulcanizer, and by introducing air in the tire, a pneumatic tire can be obtained.

Herein, Mw and Mn are measured using a gel permeation chromatograph (GPC), and are converted based on standard polystyrene.

A glass transition temperature (Tg) is measured with a differential scanning calorimeter (DSC).

A Mooney viscosity is measured in accordance with JIS K 6300.

A range simply indicated by, for example, "1 to 99% by weight" is construed so as to include the figures at both ends.

EXAMPLE

The present invention is explained by means of Examples, but is not limited to the Examples.

Various chemicals used for synthesis of diene copolymers and preparation of rubber compositions in Examples and Comparative Examples are collectively shown below. The various chemicals were subjected to purification according to necessity by a usual method.

<Various Chemicals Used for Synthesis of Branched Conjugated Diene Copolymers>

Hexane: Normal hexane available from Kanto Chemical Industry Co., Ltd. (special grade)

Isopropanol: Isopropanol available from Kanto Chemical Industry Co., Ltd. (special grade)

TMEDA: Tetramethylethylenediamine available from Kanto Chemical Industry Co., Ltd. (reagent)
Butadiene: 1,3-Butadiene available from Takachiho Chemical Industrial Co., Ltd.
Styrene: Styrene available from Wako Pure Chemical Industries, Ltd. (reagent)
Myrcene: β-myrcene available from Wako Pure Chemical Industries, Ltd. (reagent)
Farnesene: (E)-β-Farnesene available from Nippon Terpene Chemicals, Inc. (reagent)

<Various Chemicals Used for Preparation of Rubber Composition>

NR: Natural rubber (TSR 20)
Copolymer: Those synthesized in accordance with the description of this specification
Carbon black: SHOBLACK N220 (Nitrogen adsorption specific surface area ($N_2SA$): 125 $m^2/g$) available from Cabot Japan K.K.
Silica: Ultra Jill VN3 (Nitrogen adsorption specific surface area ($N_2SA$): 175 $m^2/g$) available from Degussa AG
Silane coupling agent: Si69 (bis(3-triethoxysilylpropyl)tetrasulfide) available from Degussa AG
Antioxidant: NOCRAC 6C (N-1,3-dimethylbutyl-N'-phenyl-phenylenediamine) available from Ouchi Shinko Chemical Industrial Co., Ltd.
Stearic acid: Stearic acid available from NOF CORPORATION
Oil: Mineral oil PW-380 available from Idemitsu Kosan Co., Ltd.
Zinc oxide: Zinc White Grade 1 available from Mitsui Mining & Smelting Co., Ltd.
Wax: SUNNOC Wax N available from Ouchi Shinko Chemical Industrial Co., Ltd.
Sulfur: Powdered sulfur available from Tsurumi Chemical Industry Co., Ltd.
Vulcanization accelerator 1: NOCCELER CZ (N-cyclohexyl-2-benzothiazolylsulfenamide) available from Ouchi Shinko Chemical Industrial Co., Ltd.
Vulcanization accelerator 2: NOCCELER D (N,N'-diphenylguanidine) available from Ouchi Shinko Chemical Industrial Co., Ltd.

1. Myrcene Copolymer

Example 1

(1) Synthesis of Copolymer 1

Into a 3-liter pressure resistant stainless steel vessel having been subjected to drying and replacement with nitrogen, 2000 ml of hexane, 10 g of myrcene, 140 g of butadiene, 50 g of styrene, and 0.22 mmol of TMEDA were added, and further, 1.17 mmol of n-butyllithium (n-BuLi) was added thereto, followed by 3-hour polymerization reaction at 50° C. After three hours had elapsed, 1.15 ml of 1M isopropanol/hexane solution was added dropwise to terminate the reaction. The obtained polymerization solution was subjected to blast drying to remove the solvent, followed by drying under reduced pressure at an inner pressure of 0.1 kPa or less at a temperature of 50° C. until a constant, weight is reached. Thus, 200 g (dry weight) of Copolymer 1 was obtained. The degree of polymerization (percentage of dry weight/charged amount) was nearly 100%.

(2) Preparation of Unvulcanized Rubber Composition 1

The Copolymer 1 obtained above and the above-mentioned various chemicals for preparation of a rubber composition (except insoluble sulfur and vulcanization accelerators) were kneaded at 150° C. for five minutes in a Banbury mixer in accordance with the formulation shown in Table 2, and a kneaded product was obtained. Sulfur and vulcanization accelerators were added to the kneaded product, followed by 12-minute kneading at 170° C. using an open roll to obtain Unvulcanized Rubber Composition 1.

(3) Preparation of Vulcanized Rubber Composition 1

The Unvulcanized Rubber Composition obtained in (2) above was subjected to 20-minute press-vulcanization at 170° C. to obtain Vulcanized Rubber Composition 1.

Example 2

(1) Synthesis of Copolymer 2

Processing was carried out in the same manner as in (1) of Example 1 except that the amounts of myrcene and butadiene were changed to 20 g and 130 g, respectively, to obtain 200 g of Copolymer 2. The degree of polymerization was nearly 100%.

(2) Preparation of Unvulcanized Rubber Composition 2

Processing was carried out in the same manner as in (2) of Example 1 except that Copolymer 2 was used instead of Copolymer 1, to obtain Unvulcanized Rubber Composition 2.

(3) Preparation of Vulcanized Rubber Composition 2

Unvulcanized Rubber Composition obtained in (2) above was subjected to processing in the same manner as in (3) of Example 1 to obtain Vulcanized Rubber Composition 2.

Example 3

(1) Synthesis of Copolymer 3

Processing was carried out in the same manner as in (1) of Example 1 except that the amounts of myrcene and butadiene were changed to 40 g and 110 g, respectively, to obtain 200 g of Copolymer 3. The degree of polymerization was nearly 100%.

(2) Preparation of Unvulcanized Rubber Composition 3

Processing was carried out in the same manner as in (2) of Example 1 except that Copolymer 3 was used instead of Copolymer 1, to obtain Unvulcanized Rubber Composition 3.

(3) Preparation of Vulcanized Rubber Composition 3

Unvulcanized Rubber Composition obtained in (2) above was subjected to processing in the same manner as in (3) of Example 1 to obtain Vulcanized Rubber Composition 3.

Example 4

(1) Synthesis of Copolymer 4

Processing was carried out in the same manner as in (1) of Example 1 except that the amounts of myrcene and butadiene were changed to 90 g and 60 g, respectively, to obtain 200 g of Copolymer 1. The degree of polymerization was nearly 100%.

(2) Preparation of Unvulcanized Rubber Composition 4

Processing was carried out in the same manner as in (2) of Example 1 except that Copolymer 4 was used instead of Copolymer 1, to obtain Unvulcanized Rubber Composition 4.

(3) Preparation of Vulcanized Rubber Composition 4

Unvulcanized Rubber Composition obtained in (2) above was subjected to processing in the same manner as in (3) of Example 1 to obtain Vulcanized Rubber Composition 4.

Comparative Example 1

(1) Synthesis of Copolymer 5

Processing was carried out in the same manner as in (1) of Example 1 except that the amounts of myrcene and butadiene were changed to 0 g and 150 g, respectively to obtain 200 g of Copolymer 5. The degree of polymerization was nearly 100%.

(2) Preparation of Unvulcanized Rubber Composition 5

Processing was carried out in the same manner as in (2) of Example 1 except that Copolymer 5 was used instead of Copolymer 1, to obtain Unvulcanized Rubber Composition 5.

(3) Preparation of Vulcanized Rubber Composition 5

Unvulcanized Rubber Composition obtained in (2) above was subjected to processing in the same manner as in (3) of Example 1 to obtain Vulcanized Rubber Composition 5.

<Measurements on Copolymers>

With respect to the obtained Copolymers 1 to 5, weight-average molecular weight Mw, number-average molecular weight Mn, glass transition temperature Tg, Mooney viscosity and a copolymerization ratio (l) of the branched conjugated diene compound (1) were measured by the following methods. The results are shown in Table 1.

(Measurement of Weight-Average Molecular Weight Mw, Number-Average Molecular Weight Mn)

Mw and Mn were measured with an apparatus GPC-8000 Series available from TOSO CORPORATION and a differential refractometer as a detector, and were converted based on standard polystyrene.

(Measurement of Glass Transition Temperature Tg)

Measurement was carried out using a differential scanning calorimeter (DSC) at a heat-up rate of 10° C./min from an initial temperature of −150° C. to a final temperature of 150° C. to calculate Tg.

(Measurements of Mooney Viscosity of Copolymer)

With respect to each copolymer, a Mooney viscosity $ML_{l+4}$ (130° C.) thereof was measured using a Mooney viscosity tester in accordance with JIS K 6300 "Test Method of Unvulcanized Rubber" through processes that pre-heating to 130° C. was carried out for one minute, and under this temperature condition a large rotor was rotated, and after a lapse of four minutes the Mooney viscosity was measured. The smaller the Mooney viscosity is, the better the processability is.

(Copolymerization Ratio (l) of Branched Conjugated Diene Compound (1))

The copolymerization ratio (l) (% by weight) was measured by a usual method using a pyrolysis gas chromatography (PGC). Namely, a calibration curve of a purified branched conjugated diene compound (1) was prepared, and % by weight of the branched conjugated diene compound (1) in the copolymer was calculated using an area ratio of a pyrolyzate derived from the branched conjugated diene compound (1) which was obtained by PGC. In the pyrolysis chromatography, a system comprising a gas chromatograph mass spectrometer GCMS-QP5050A available from Shimadzu Corporation and a pyrolyzer JHP-330 available from Japan Analytical Industry Co., Ltd. was used.

TABLE 1

|  | Example 1 | Example 2 | Example 3 | Example 4 | Com. Ex. 1 |
| --- | --- | --- | --- | --- | --- |
| Copolymer | Copolymer 1 | Copolymer 2 | Copolymer 3 | Copolymer 4 | Copolymer 5 |
| Charging amount (% by weight) | | | | | |
| Branched conjugated diene compound (1) (myrcene monomer) | 5.0 | 10.0 | 20.0 | 45.0 | 0.0 |
| Conjugated diene compound (2) (butadiene monomer) | 70.0 | 65.0 | 55.0 | 30.0 | 75.0 |
| Vinyl compound (3) (styrene monomer) | 25.0 | 25.0 | 25.0 | 25.0 | 25.0 |
| Number-average molecular weight (Mn) | 240,000 | 240,000 | 300,000 | 490,000 | 240,000 |
| Weight-average molecular weight (Mw) | 260,000 | 260,000 | 330,000 | 540,000 | 260,000 |
| Molecular weight distribution (Mw/Mn) | 1.1 | 1.1 | 1.1 | 1.1 | 1.1 |
| Glass transition temperature (Tg) | −23° C. | −24° C. | −26° C. | −28° C. | −23° C. |
| Mooney viscosity $ML_{1+4}$ (130° C.) | 40.1 | 35.1 | 37.1 | 33.4 | 46.3 |
| Copolymerization ratio (l) (% by weight) | 5.0 | 10.0 | 20.0 | 45.0 | — |

In the Table, "—" indicates that there was no detection. (hereinafter the same)

As shown in Table 1, the Mooney viscosity $ML_{1+4}$ (130° C.) of Copolymer 1 or 2 of the present invention was lower and processability was good compared with Copolymer 5 in which the myrcene was replaced by the conjugated diene compound (2) and which had the same Mw (260,000). Further, Copolymer 3 or 4 was excellent in processability irrespective of a larger Mw compared with Copolymer 5.

<Evaluation of Rubber Composition>

The following tests were carried out using the unvulcanized rubber compositions 1 to 5 and vulcanized rubber compositions 1 to 5 obtained above. The results are shown in Table 2.

(Processability)

A test piece of a given size was prepared from the above unvulcanized rubber composition, and a Mooney viscosity $ML_{1+10}$ (130° C.) thereof was measured using a Mooney viscosity tester in accordance with JIS K 6300 "Test Method of Unvulcanized Rubber". The test piece was pre-heated to 130° C. for one minute, and under this temperature condition a large rotor was rotated, and after a lapse of ten minutes the Mooney viscosity $ML_{1+10}$ (130° C.) was measured. The smaller the Mooney viscosity is, the better the processability is.

(Strength of Rubber)

According to JIS K 6251 "Vulcanized Rubber and Thermoplastic Rubber—Method of Obtaining Tensile Characteristics", tensile tests were carried to measure the tensile strength TB (MPa) and the elongation EB (%) at break using a No. 3 dumbbell type test piece made of the vulcanized rubber composition. The larger TB shows the more excellent rubber strength. Similarly, the larger EB shows the more excellent rubber strength.

(Grip Performance)

An unvulcanized rubber sheet was formed into a tread shape and laminated with other tire parts, and the laminates were subjected to press-vulcanization under the condition of 170° C. for 12 minutes to produce tires for a cart (tire size: 11×1.10-5). The above-mentioned tires were loaded on a cart, and the cart was run 8 rounds of a 2 km test course to carry out a road test. Assuming that the grip performance of a tire of Comparative Example 1 is 100 points, a test driver made a sensory assessment on a maximum of 200 points. An initial grip performance is grip performance of 1 to 4 rounds, and a latter half grip performance is grip performance of 5 to 8 rounds. The larger the value is, the better the grip performance is.

(Abrasion Resistance)

With respect to the tires after the road test, assuming that appearance of abrasion of a tire of Comparative Example 1 is 100 points, relative evaluation of abrasion of each formulation was carried out on a maximum of 200 points. The larger the value is, the better the abrasion resistance is.

TABLE 2

|  | Example 1 | Example 2 | Example 3 | Example 4 | Com. Ex. 1 |
|---|---|---|---|---|---|
| Blending amount (part by weight) | | | | | |
| NR | 30 | 30 | 30 | 30 | 30 |
| Copolymer 1 | 70 | | | | |
| Copolymer 2 | | 70 | | | |
| Copolymer 3 | | | 70 | | |
| Copolymer 4 | | | | 70 | |
| Copolymer 5 | | | | | 70 |
| Carbon black | 5 | 5 | 5 | 5 | 5 |
| Silica | 75 | 75 | 75 | 75 | 75 |
| Silane coupling agent | 5 | 5 | 5 | 5 | 5 |
| Wax | 2 | 2 | 2 | 2 | 2 |
| Oil | 20 | 20 | 20 | 20 | 20 |
| Antioxidant | 2 | 2 | 2 | 2 | 2 |
| Stearic acid | 2 | 2 | 2 | 2 | 2 |
| Zinc oxide | 3 | 3 | 3 | 3 | 3 |
| Sulfur | 2 | 2 | 2 | 2 | 2 |
| Vulcanization accelerator 1 | 2 | 2 | 2 | 2 | 2 |
| Vulcanization accelerator 2 | 1 | 1 | 1 | 1 | 1 |
| Results of evaluation | | | | | |
| Mooney viscosity $ML_{1+10}$ (130° C.) | 42.0 | 39.9 | 34.4 | 33.4 | 45.9 |
| Tensile strength (TB) (MPa) | 15.0 | 15.2 | 15.6 | 16.2 | 14.7 |
| Elongation at break (EB) (%) | 262.2 | 263.2 | 307.7 | 280.0 | 260.8 |
| Grip performance | | | | | |
| Initial grip (1 to 4 rounds) | 105 | 110 | 115 | 124 | 100 |
| Latter half grip (5 to 8 rounds) | 110 | 108 | 105 | 102 | 100 |
| Abrasion resistance | 105 | 104 | 104 | 101 | 100 |

As shown in Table 2, while the Mooney viscosity of Comparative Example 1 was high and processability was not good, the Mooney viscosity of any of Examples 1 to 4 in which the myrcene was blended was low and processability was improved. Further, compared with Comparative Example 1, tensile strength, elongation at break, grip performance and abrasion resistance of Examples 1 to 4 were good, and improvement of processability was achieved while keeping rubber strength and performance.

2. Farnesene Copolymer

Example 5

(1) Synthesis of Copolymer 6

Into a 3-liter pressure resistant stainless steel vessel having been subjected to drying and replacement with nitrogen, 2000 ml of hexane, 10 g of farnesene, 140 g of butadiene, 50 g of styrene, and 0.22 mmol of TMEDA were added, and further, 1.17 mmol of n-butyllithium (n-BuLi) was added thereto, followed by 3-hour polymerization reaction at 50° C. After three hours had elapsed, 1.15 ml of 1M isopropanol/hexane solution was added dropwise to terminate the reaction. The obtained polymerization solution was subjected to blast drying to remove the solvent, followed by drying under reduced pressure at an inner pressure of 0.1 kPa or less at a temperature of 50° C. until a constant weight is reached. Thus, 200 g of Copolymer 6 was obtained. The degree of polymerization (percentage of dry weight/charged amount) was nearly 100%.

(2) Preparation of Unvulcanized Rubber Composition 6

The Copolymer 6 obtained above and the above-mentioned various chemicals for preparation of a rubber composition (except insoluble sulfur and vulcanization accelerators) were kneaded at 150° C. for five minutes in a Banbury mixer in accordance with the formulation shown in Table 4, and a kneaded product was obtained. Sulfur and vulcanization accelerators were added to the kneaded product, followed by 12-minute kneading at 170° C. using an open roll to obtain Unvulcanized Rubber Composition 6.

(3) Preparation of Vulcanized Rubber Composition 6

The Unvulcanized Rubber Composition 6 obtained in (2) above was subjected to 20-minute press-vulcanization at 170° C. to obtain Vulcanized Rubber Composition 6.

Example 6

(1) Synthesis of Copolymer 7

Processing was carried out in the same manner as in (1) of Example 5 except that the amounts of farnesene and butadiene were changed to 20 g and 130 g, respectively, to obtain 200 g of Copolymer 7. The degree of polymerization was nearly 100%.

(2) Preparation of Unvulcanized Rubber Composition 7

Processing was carried out in the same manner as in (2) of Example 5 except that Copolymer 7 was used instead of Copolymer 6, to obtain Unvulcanized Rubber Composition 7.

(3) Preparation of Vulcanized Rubber Composition 7

Unvulcanized Rubber Composition 7 obtained in (2) above was subjected to processing in the same manner as in (3) of Example 5 to obtain Vulcanized Rubber Composition 7.

Example 7

(1) Synthesis of Copolymer 8

Processing was carried out in the same manner as in (1) of Example 5 except that the amounts of farnesene and butadiene were changed to 40 g and 110 g, respectively, to obtain 200 g of Copolymer 8. The degree of polymerization was nearly 100%.

(2) Preparation of Unvulcanized Rubber Composition 8

Processing was carried out in the same manner as in (2) of Example 5 except that Copolymer 8 was used instead of Copolymer 6, to obtain Unvulcanized Rubber Composition 8.

(3) Preparation of Vulcanized Rubber Composition 8

Unvulcanized Rubber Composition 8 obtained in (2) above was subjected to processing in the same manner as in (3) of Example 5 to obtain Vulcanized Rubber Composition 8.

Example 8

(1) Synthesis of Copolymer 9

Processing was carried out in the same manner as in (1) of Example 5 except that the amounts of farnesene and butadiene were changed to 90 g and 60 g, respectively, to obtain 200 g of Copolymer 9. The degree of polymerization was nearly 100%.

(2) Preparation of Unvulcanized Rubber Composition 9

Processing was carried out in the same manner as in (2) of Example 5 except that Copolymer 9 was used instead of Copolymer 6, to obtain Unvulcanized Rubber Composition 9.

(3) Preparation of Vulcanized Rubber Composition 9

Unvulcanized Rubber Composition 9 obtained in (2) above was subjected to processing in the same manner as in (3) of Example 5 to obtain Vulcanized Rubber Composition 9.

Comparative Example 2

(1) Synthesis of Copolymer 10

Processing was carried out in the same manner as in (1) of Example 5 except that the amounts of farnesene and butadiene were changed to 0 g and 150 g to obtain 200 g of Copolymer 10. The degree of polymerization was nearly 100%.

(2) Preparation of Unvulcanized Rubber Composition 10

Processing was carried out in the same manner as in (2) of Example 5 except that Copolymer 10 was used instead of Copolymer 6, to obtain Unvulcanized Rubber Composition 10.

(3) Preparation of Vulcanized Rubber Composition 10

Unvulcanized Rubber Composition 10 obtained in (2) above was subjected to processing in the same manner as in (3) of Example 5 to obtain Vulcanized Rubber Composition 10.

<Measurements on Copolymers>

With respect to the obtained Copolymers 6 to 10, weight-average molecular weight Mw, number-average molecular weight Mn, glass transition temperature Tg, Mooney viscosity and a copolymerization ratio (l) of the branched conjugated diene compound (1) were measured by the following methods.

(Measurement of Weight-Average Molecular Weight Mw, Number-Average Molecular Weight Mn)

Mw and Mn were measured with an apparatus GPC-8000 Series available from TOSO CORPORATION and a differential refractometer as a detector, and were converted based on standard polystyrene. The results are shown in Table 3.

(Measurement of Glass Transition Temperature Tg)

Measurement was carried out using a differential scanning calorimeter (DSC) at a heat-up rate of 10° C./min from an initial temperature of −150° C. to a final temperature of 150° C. to calculate Tg.

(Measurements of Mooney Viscosity of Copolymer)

With respect to each copolymer, a Mooney viscosity $ML_{1+4}$ (130° C.) thereof was measured using a Mooney viscosity tester in accordance with JIS K 6300 "Test Method of Unvulcanized Rubber" through processes that pre-heating to 130° C. was carried out for one minute, and under this temperature condition a large rotor was rotated, and after a lapse of four minutes the Mooney viscosity was measured. The smaller the Mooney viscosity is, the better the processability is. The results are shown in Table 3.

(Copolymerization Ratio (l) of Branched Conjugated Diene Compound (1))

The copolymerization ratio (l) (% by weight) was measured by a usual method using a pyrolysis gas chromatography (PGC). Namely, a calibration curve of a purified branched conjugated diene compound (1) was prepared, and % by weight of the branched conjugated diene compound (1) in the copolymer was calculated using an area ratio of a pyrolyzate derived from the branched conjugated diene compound (1) which was obtained by PGC. In the pyrolysis chromatography, a system comprising a gas chromatograph mass spectrometer GCMS-QP5050A available from Shimadzu Corporation and a pyrolyzer JHP-330 available from Japan Analytical Industry Co., Ltd. was used.

<Evaluation of Rubber Composition>

The following tests were carried out using the unvulcanized rubber compositions 6 to 10 and vulcanized rubber compositions 6 to 10 obtained above. The results are shown in Table 4.

(Processability)

A test piece of a given size was prepared from the above unvulcanized rubber composition, and a Mooney viscosity $ML_{1+10}$ (130° C.) thereof was measured using a Mooney viscosity tester in accordance with JIS K 6300 "Test Method of Unvulcanized Rubber". The test piece was pre-heated to 130° C. for one minute, and under this temperature condition a large rotor was rotated, and after a lapse of ten minutes the Mooney viscosity $ML_{1+10}$ (130° C.) was measured. The smaller the Mooney viscosity is, the better the processability is.

(Strength of Rubber)

According to JIS K 6251 "Vulcanized Rubber and Thermoplastic Rubber—Method of Obtaining Tensile Characteristics", the tensile strength TB (MPa) and the elongation EB (%) at break were measured by carrying out a tensile test using a No. 3 dumbbell type test piece made of the vulcanized rubber composition. The larger TB shows the more excellent rubber strength. Similarly, the larger EB shows the more excellent rubber strength.

(Grip Performance)

An unvulcanized rubber sheet was formed into a tread shape and laminated with other tire parts, and the laminates were subjected to press-vulcanization under the condition of 170° C. for 12 minutes to produce tires for a cart (tire size: 11×1.10-5). The above-mentioned tires were loaded on a cart, and the cart was run 8 rounds of a 2 km test course to carry out a road test. Assuming that the grip performance of a tire of Comparative Example 1 is 100 points, a test driver made a sensory assessment on a maximum of 200 points. An initial

TABLE 3

|  | Ex. 5 | Ex. 6 | Ex. 7 | Ex. 8 | Com. Ex. 2 |
|---|---|---|---|---|---|
| Copolymer | 6 | 7 | 8 | 9 | 10 |
| Charging amount (% by weight) |  |  |  |  |  |
| Branched conjugated diene compound (1) (farnesene monomer) | 5.0 | 10.0 | 20.0 | 45.0 | 0.0 |
| Conjugated diene compound (2) (butadiene monomer) | 70.0 | 65.0 | 55.0 | 30.0 | 75.0 |
| Vinyl compound (3) (styrene monomer) | 25.0 | 25.0 | 25.0 | 25.0 | 25.0 |
| Number-average molecular weight (Mn) | 380,000 | 420,000 | 480,000 | 560,000 | 240,000 |
| Weight-average molecular weight (Mw) | 420,000 | 460,000 | 530,000 | 620,000 | 260,000 |
| Molecular weight distribution (Mw/Mn) | 1.1 | 1.1 | 1.1 | 1.1 | 1.1 |
| Glass transition temperature (Tg) | −21° C. | −25° C. | −20° C. | −22° C. | −23° C. |
| Mooney viscosity $ML_{1+4}$ (130° C.) | 42.1 | 38.1 | 35.4 | 32.1 | 46.3 |
| Copolymerization ratio (l) (% by weight) | 5.0 | 10.0 | 20.0 | 45.0 | — |

As shown in Table 3, Copolymers 6 to 9 of the present invention has a lower Mooney viscosity $ML_{1+4}$ (130° C.) irrespective of Mw of 420,000 to 620,000 compared with Copolymer 10 consisting of the conjugated diene compound (2) and the vinyl compound (3) and having Mw of 260,000. Therefore, it is clear that the copolymers of the present invention have a lower Mooney viscosity $ML_{1+4}$ (130° C.) compared with a copolymer in which the farnesene is replaced by the conjugated diene compound (2) and which has the same Mw. From this, it can be said that the copolymers of the present invention have good processability.

grip performance is grip performance of 1 to 4 rounds, and a latter half grip performance is grip performance of 5 to 8 rounds. The larger the value is, the better the grip performance is.

(Abrasion Resistance)

With respect to the tires after the road test, assuming that appearance of abrasion of a tire of Comparative Example 2 is 100 points, relative evaluation of abrasion of each formulation was carried out on a maximum of 200 points. The larger the value is, the better the abrasion resistance is.

TABLE 4

| | Example 5 | Example 6 | Example 7 | Example 8 | Com. Ex. 2 |
|---|---|---|---|---|---|
| Blending amount (part by weight) | | | | | |
| NR | 30 | 30 | 30 | 30 | 30 |
| Copolymer 6 | 70 | | | | |
| Copolymer 7 | | 70 | | | |
| Copolymer 8 | | | 70 | | |
| Copolymer 9 | | | | 70 | |
| Copolymer 10 | | | | | 70 |
| Carbon black | 5 | 5 | 5 | 5 | 5 |
| Silica | 75 | 75 | 75 | 75 | 75 |
| Silane coupling agent | 5 | 5 | 5 | 5 | 5 |
| Wax | 2 | 2 | 2 | 2 | 2 |
| Oil | 20 | 20 | 20 | 20 | 20 |
| Antioxidant | 2 | 2 | 2 | 2 | 2 |
| Stearic acid | 2 | 2 | 2 | 2 | 2 |
| Zinc oxide | 3 | 3 | 3 | 3 | 3 |
| Sulfur | 2 | 2 | 2 | 2 | 2 |
| Vulcanization accelerator 1 | 2 | 2 | 2 | 2 | 2 |
| Vulcanization accelerator 2 | 1 | 1 | 1 | 1 | 1 |
| Results of evaluation | | | | | |
| Mooney viscosity $ML_{1+10}$ (130° C.) | 40.1 | 38.0 | 33.4 | 31.4 | 45.9 |
| Tensile strength (TB) (MPa) | 17.0 | 18.2 | 18.6 | 20.2 | 14.7 |
| Elongation at break (EB) (%) | 266.1 | 268.2 | 321.8 | 322.0 | 260.8 |
| Grip performance | | | | | |
| Initial grip (1 to 4 rounds) | 110 | 115 | 120 | 127 | 100 |
| Latter half grip (5 to 8 rounds) | 112 | 111 | 108 | 106 | 100 |
| Abrasion resistance | 108 | 107 | 104 | 102 | 100 |

As shown in Table 4, while the Mooney viscosity of Comparative Example 2 was high and processability was not good, in any of Examples 5 to 8 in which the farnesene was blended, the Mooney viscosity was low and processability was improved. Further, compared with Comparative Example 2, tensile strength, elongation at break, grip performance and abrasion resistance of Examples 5 to 8 were good, and improvement of processability was achieved while keeping rubber strength and performance.

INDUSTRIAL APPLICABILITY

The present invention can provide a novel branched conjugated copolymer being useful for improving processability as a rubber component of a rubber composition for a tire, a rubber composition comprising the branched conjugated copolymer, in particular, a rubber composition enhancing both of abrasion resistance and grip performance to a high level and exhibiting excellent processability, and a pneumatic tire prepared using the rubber composition for a tire.

The invention claimed is:

1. A branched conjugated diene copolymer prepared by copolymerizing a branched conjugated diene compound, a conjugated diene compound and a vinyl compound, wherein the branched conjugated diene compound is farnesene, the conjugated diene compound is 1,3-butadiene, the vinyl compound is styrene, and the branched conjugated diene copolymer has a copolymerization ratio (l) of the branched conjugated diene compound which is 1 to 20% by weight, a copolymerization ratio (m) of the conjugated diene compound which is 30 to 70% by weight, and a copolymerization ratio (n) of the vinyl compound which is not less than 25 and less than 60% by weight.

2. The branched conjugated diene copolymer of claim 1, wherein the copolymerization ratio (l) of the branched conjugated diene compound is 2.5 to 20% by weight.

3. The branched conjugated diene copolymer of claim 1, which is low in a Mooney viscosity $ML_{1+4}$ (130° C.) compared with a copolymer which has the same weight-average molecular weight and in which the branched conjugated diene compound is replaced by the conjugated diene compound.

4. A rubber composition comprising the branched conjugated diene copolymer of claim 1.

5. A pneumatic tire produced by a method comprising processing the rubber composition of claim 4.

6. A pneumatic tire produced by a method comprising processing a rubber composition comprising a branched conjugated diene copolymer prepared by copolymerizing a branched conjugated diene compound, a conjugated diene compound and a vinyl compound, wherein the branched conjugated diene compound is farnesene, the conjugated diene compound is 1,3-butadiene, the vinyl compound is styrene, and the branched conjugated diene copolymer has a copolymerization ratio (l) of the branched conjugated diene compound which is 1 to 99% by weight, a copolymerization ratio (m) of the conjugated diene compound which is less than 99% by weight, and a copolymerization ratio (n) of the vinyl compound which is less than 99% by weight.

7. The pneumatic tire of claim 6, wherein the copolymerization ratio (l) of the branched conjugated diene compound is not less than 2.5 and less than 75% by weight, the copolymerization ratio (m) of the conjugated diene compound is 72.5% by weight or less, and the copolymerization ratio (n) of the vinyl compound is not less than 25 and less than 97.5% by weight.

8. The pneumatic tire of claim 6, which is low in a Mooney viscosity $ML_{1+4}$ (130° C.) compared with a copolymer which has the same weight-average molecular weight and in which the branched conjugated diene compound is replaced by the conjugated diene compound.

9. The pneumatic tire of claim 6, wherein the processing of the rubber composition includes vulcanizing the rubber composition.

10. The pneumatic tire of claim 5, wherein the processing of the rubber composition includes vulcanizing the rubber composition.

11. The pneumatic tire of claim 6, wherein the copolymerization ratio (l) of the branched conjugated diene compound is 1 to 20% by weight, the copolymerization ratio (m) of the conjugated diene compound is 30 to 70% by weight, and the copolymerization ratio (n) of the vinyl compound is not less than 25 and less than 60% by weight.

12. The pneumatic tire of claim 11, wherein the copolymerization ratio (l) of the branched conjugated diene compound is 2.5 to 20% by weight.

13. The branched conjugated diene copolymer of claim 1, wherein the copolymerization ratio (m) of the conjugated diene compound is 55 to 70% by weight.

14. The pneumatic tire of claim 11, wherein the copolymerization ratio (m) of the conjugated diene compound is 55 to 70% by weight.

15. A rubber composition comprising the branched conjugated diene copolymer of claim 2.

16. A rubber composition comprising the branched conjugated diene copolymer of claim 3.

17. A pneumatic tire produced by a method comprising processing the rubber composition of claim 15.

18. A pneumatic tire produced by a method comprising processing the rubber composition of claim 16.

19. The pneumatic tire of claim 7, which is low in a Mooney viscosity $ML_{1+4}$ (130° C.) compared with a copolymer which has the same weight-average molecular weight and in which the branched conjugated diene compound is replaced by the conjugated diene compound.

20. The pneumatic tire of claim 7, wherein the processing of the rubber composition includes vulcanizing the rubber composition.

\* \* \* \* \*